United States Patent
Watanabe et al.

(10) Patent No.: US 6,857,921 B2
(45) Date of Patent: Feb. 22, 2005

(54) MARINE GAS CYLINDER APPARATUS

(75) Inventors: Yoshimi Watanabe, Saitama (JP); Mitsuhiro Hayashi, Saitama (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 10/448,911

(22) Filed: May 30, 2003

(65) Prior Publication Data

US 2004/0087226 A1 May 6, 2004

(30) Foreign Application Priority Data

Oct. 30, 2002 (JP) ........................................ 2002-316771

(51) Int. Cl.[7] ............................................. B63H 5/125
(52) U.S. Cl. ....................................................... 440/56
(58) Field of Search ........................... 440/55, 56, 61 T; 188/266.3, 266.5, 318

(56) References Cited

U.S. PATENT DOCUMENTS 5,389,019 A * 2/1995 Tsujii ........................... 440/56
5,489,226 A * 2/1996 Nakamura et al. ......... 440/61 R
6,213,822 B1 * 4/2001 Saito et al. ................ 440/61 R
2003/0228811 A1 * 12/2003 Sekikawa et al. ......... 440/61 T
2004/0087227 A1 * 5/2004 Sekikawa ................. 440/61 T

FOREIGN PATENT DOCUMENTS

JP          HEI31200          1/1991

* cited by examiner

*Primary Examiner*—Sherman Basinger
(74) *Attorney, Agent, or Firm*—Orum & Roth

(57) ABSTRACT

In a marine gas cylinder apparatus provided with a switching valve apparatus capable of switching a communication state among a piston rod side oil chamber, a piston side oil chamber and a gas chamber, the switching valve apparatus is structured such that each of respective poppet valves are arranged in each of ports open to a communication chamber provided in a valve case, each of balls is held between a ball operation surface of a rotation plate supported to the valve case and each of the poppet valves. Each of the poppet valves is moved close to or apart from the corresponding port via each of the balls in accordance with a rotating operation of the rotation plate.

17 Claims, 9 Drawing Sheets

MARINE GAS CYLINDER APPARATUS

BACKGROUND OF THE INVENTION

1. Field of the Invention

The present invention relates to a marine gas cylinder apparatus.

2. Description of the Related Art

In conventional devices, as described in Japanese Patent Application Publication No. 3-1200 (patent publication 1), a marine gas cylinder apparatus includes a structure in which a cylinder block is connected to one of either a hull or a propulsion unit. A piston rod inserted into the cylinder block from a rod guide provided in the cylinder block is connected to the corresponding hull or propulsion unit. A piston rod side oil chamber in a side which receives the piston rod and a piston side oil chamber in a side which does not receive the piston rod are provided within the cylinder block. A gas chamber which communicates with the piston rod side oil chamber and the piston side oil chamber is integrally formed in the cylinder block, and a switching valve apparatus capable of switching a communication state among the piston rod side oil chamber, the piston side oil chamber and the gas chamber is provided in the cylinder block. It is possible to manually tilt up and down the propulsion unit easily while obtaining an assist force applying a gas pressure to the piston rod, by communicating the piston rod side oil chamber, the piston side oil chamber and the gas chamber, on the basis of an opening operation of the switching valve apparatus.

In the prior art in the patent publication 1, the switching valve apparatus is provided with a check valve which is closed by hydraulic pressure of the piston rod side oil chamber, in a communication passage, which communicates the gas chamber with the communication chamber and communicates the piston rod side oil chamber with the communication chamber. The switching valve apparatus is provided with a check valve which is closed by a hydraulic pressure of the piston side oil chamber, in a communication passage, which communicates the piston side oil chamber with the communication chamber. At this time, since the switching valve apparatus is structured such as to open and close each of the check valves by a pin supported to a valve case, it is necessary that the switching valve apparatus is provided with a support structure which can smoothly reciprocate without the pin falling down in the valve case, so that the structure becomes large and complex.

Further, in the prior art of the patent publication 1, the gas chamber is directly connected to the communication chamber. Accordingly, the gas cylinder apparatus has a free piston, which is arranged close to the piston, and an absorber valve and a return valve are provided in the piston. When a propulsion unit is collided with an obstacle and the piston and the piston rod are temporarily extended, the oil in the gas chamber opens the check valve so as to be supplied to the lower oil chamber of the free piston. The stop position of the free piston is thereby displaced before and after the collision. Accordingly, it is impossible to coincide a return position after absorbing an impact of the piston rod against the cylinder block with a tied position before absorbing the impact.

SUMMARY OF THE INVENTION

An object of the present invention is to make it possible to move a propulsion unit up and down easily, and make a switching valve apparatus compact and simple, in a marine gas cylinder apparatus.

Another object of the present invention is to prevent a stop position of a free piston from being displaced before and after being collided with an obstacle, in a marine gas cylinder apparatus.

The present invention relates to a marine gas cylinder apparatus structured such that a cylinder block is connected to either a hull or a propulsion unit. A piston rod inserted into the cylinder block from a rod guide provided in the cylinder block is connected to the corresponding hull or the propulsion unit. A piston rod side oil chamber in a side which receives the piston rod and a piston side oil chamber in a side which does not receive the piston rod are provided within the cylinder block. A gas chamber which communicates with the piston rod side oil chamber and the piston side oil chamber is integrally formed in the cylinder block. A switching valve apparatus capable of switching a communication state among the piston rod side oil chamber, the piston side oil chamber and the gas chamber is provided in the cylinder block.

The switching valve apparatus is provided with a check valve closed by hydraulic pressure of the piston rod side oil chamber in a communication passage communicating the piston rod side oil chamber with the communication chamber and a check valve closed by hydraulic pressure of the piston side oil chamber in a communication passage communicating the piston side oil chamber with the communication chamber. A check valve is closed by hydraulic pressure of the gas chamber in a communication passage communicating the gas chamber with the communication chamber.

The switching valve apparatus opens and closes all the check valves at one time. It opens all the check valves in accordance with an opening operation, whereby all the communication passages are communicated with each other in the communication chamber, and closes all the check valves in accordance with a closing operation. All the communication passages are thereby shut off with respect to the communication chamber.

Further, the present invention relates to a marine gas cylinder apparatus structured such that a cylinder block is connected to either a hull or a propulsion unit. A piston rod inserted into the cylinder block from a rod guide provided in the cylinder block is connected to the corresponding hull or the propulsion unit. A piston rod side oil chamber in a side which receives the piston rod and a piston side oil chamber in a side which does not receive the piston rod are provided within the cylinder block. A gas chamber which communicates with the piston rod side oil chamber and the piston side oil chamber is integrally formed in the cylinder block. A switching valve apparatus capable of switching a communication state among the piston rod side oil chamber, the piston side oil chamber and the gas chamber is provided in the cylinder block.

The switching valve apparatus is provided with a check valve closed by hydraulic pressure of the piston rod side oil chamber in a communication passage communicating the gas chamber with the communication chamber and communicating the piston rod side oil chamber with the communication chamber. A check valve is closed by hydraulic pressure of the piston side oil chamber in a communication passage communicating the piston side oil chamber with the communication chamber.

The switching valve apparatus opens and closes all the check valves at one time. It opens all the check valves in accordance with an opening operation, whereby all the communication passages are communicated with each other in the communication chamber, and closes all the check valves in accordance with a closing operation. All the communication passages are thereby shut off with respect to the communication chamber.

The switching valve apparatus opens ports of the respective communication passages to the communication chamber provided in the valve case, and arranges each of the check valves which have a valve opening pressure higher than the gas charged pressure in each of the ports of the communication passage in the piston rod side oil chamber and the ports of the communication passage in the piston side oil chamber. A ball is held between a ball operation surface of a rotation body supported to the valve case and each of the check valves. The apparatus moves each of the check valves close to or apart from the corresponding port via the ball in accordance with a rotating operation of the rotation body.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
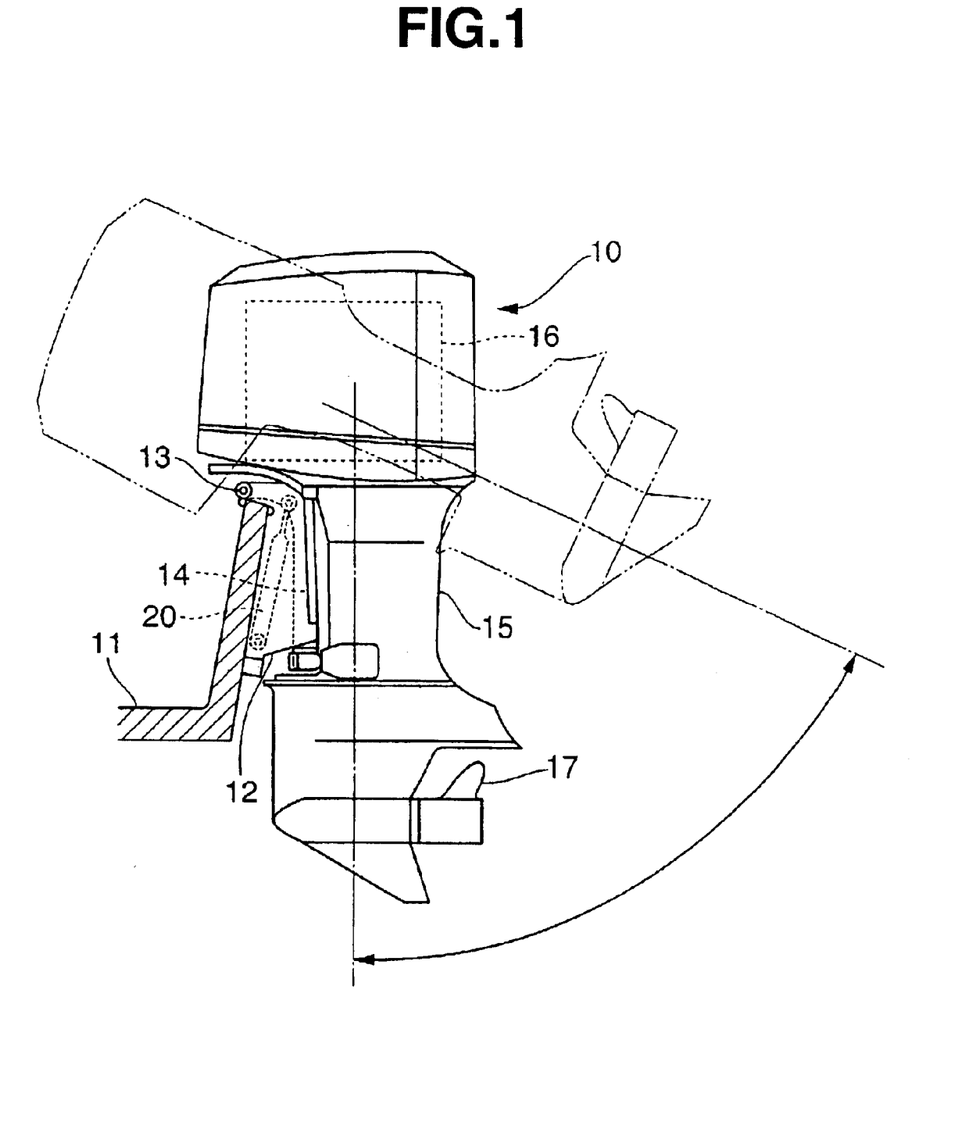
FIG. 1 is a schematic view showing a marine propulsion unit.

A marine propulsion unit, for example an outboard motor, an inboard-outdrive motor, or other type is shown in FIG. 1 as an embodiment 10. Clamp bracket 12 is fixed to a hull 11. A swivel bracket 14 is pivoted to the clamp bracket 12 via a tilt shaft 13 so as to be capable of tilting around an approximately horizontal axis A propulsion unit 15 is pivoted to the swivel bracket 14 via a rudder turning axis (not shown) so as to be capable of rotating around an approximately vertical axis. The propulsion unit 15 drives a propeller 17 by an engine unit 16.

Figure 2:
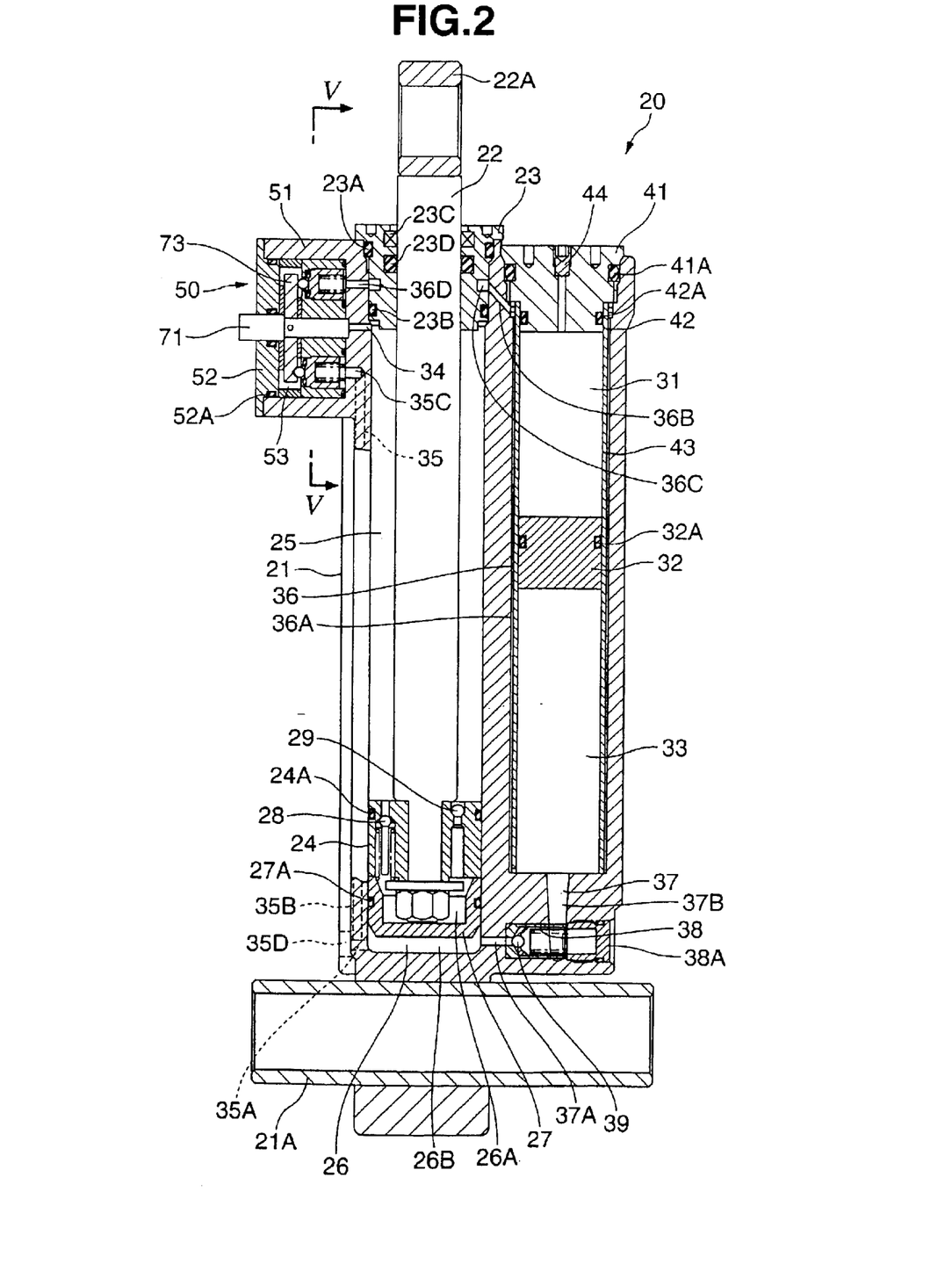
FIG. 2 is a cross sectional view showing a gas cylinder apparatus.
Figure 3:
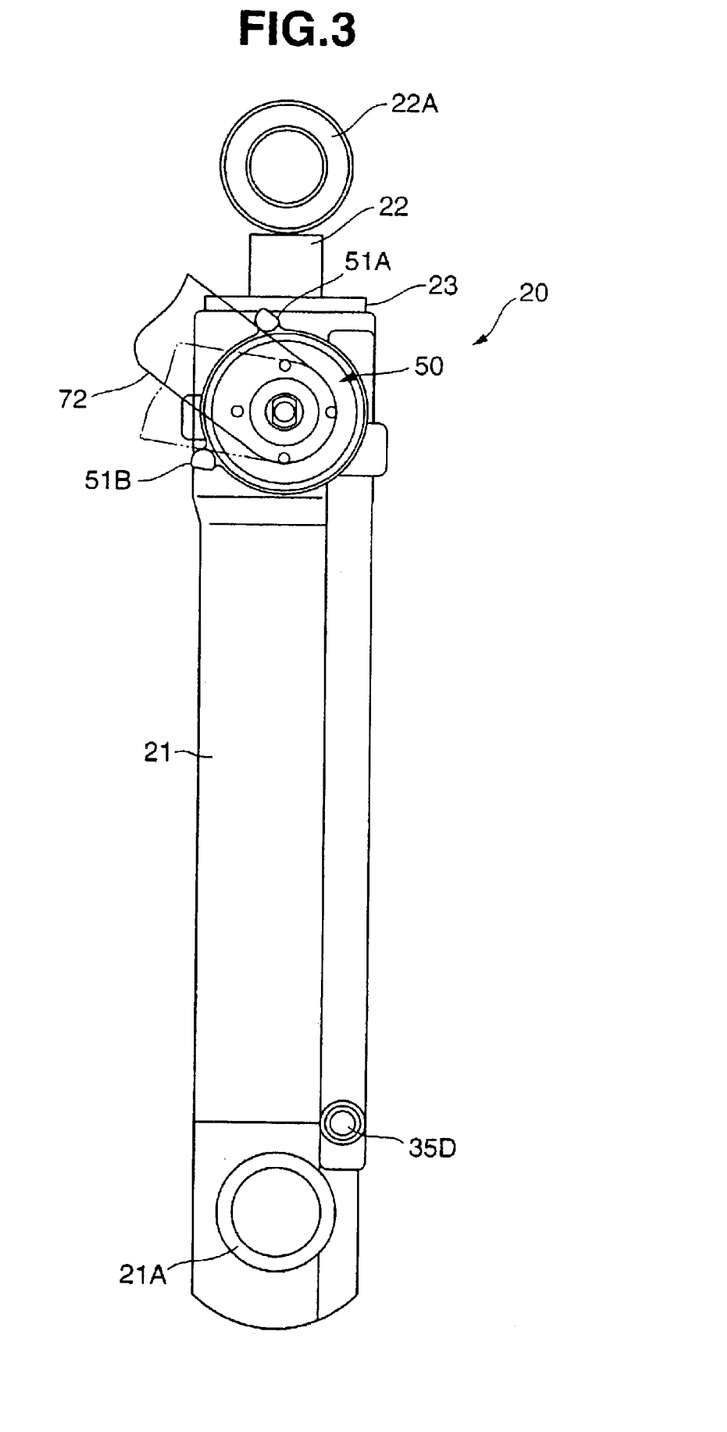
FIG. 3 is a side elevational view of FIG. 2.
Figure 4:
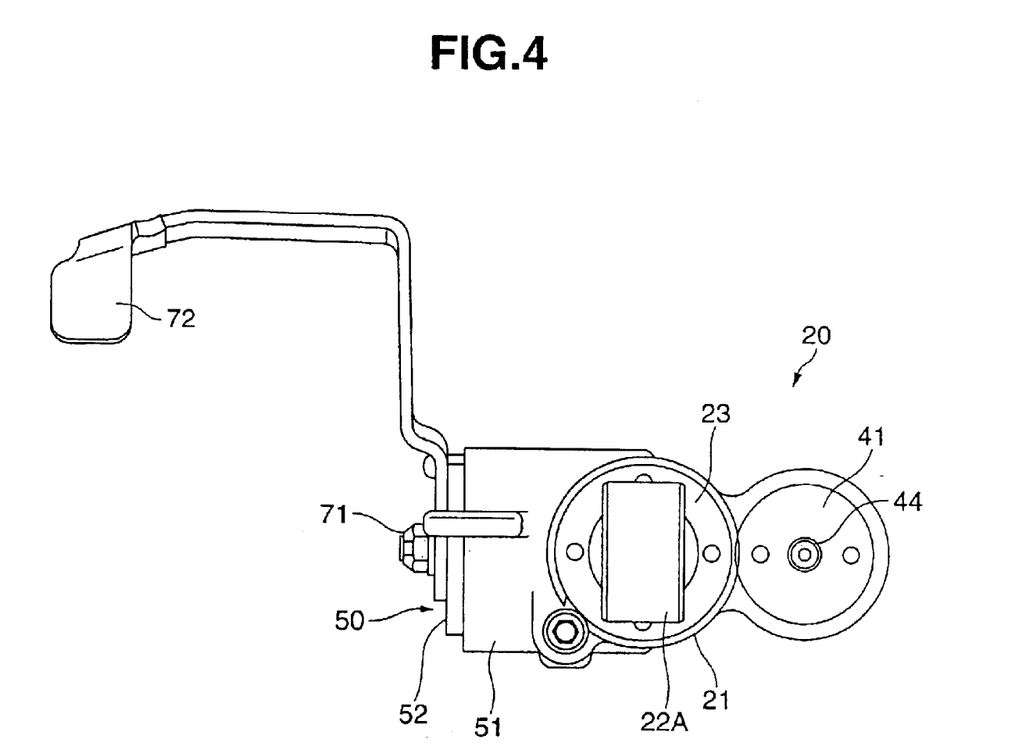
FIG. 4 is a plan view of FIG. 2.

The marine propulsion unit 10 is provided with a gas cylinder apparatus 20 between the clamp bracket 12 and the swivel bracket 14. The gas cylinder apparatus 20 has a cylinder block 21 casted of an aluminum alloy or the like, and a piston rod 22, as shown in FIGS. 2 to 4. The piston rod 22 is inserted in a liquid tight manner from a rod guide 23 which is screwed in a liquid tight manner with the cylinder block 21 via O-rings 23A and 23B, into the cylinder block 21 via an oil seal 23C and O-rings 23D. A mounting portion 21A provided in a lower end portion of the cylinder block 21 is connected to the clamp bracket 12, and a mounting portion 22A provided in an upper end portion of the piston rod 22 is connected to the swivel bracket 14.

The gas cylinder apparatus 20 is structured such that a piston 24 having an O-ring 24A is fixed to an insertion end of the piston rod 22 inserted to the cylinder block 21. A piston rod side oil chamber 25 receiving the piston rod 22 and a piston side oil chamber 26 receiving no piston rod 22 are provided in an inner portion of the cylinder block 21, and a working fluid is received in the piston rod side oil chamber 25 and the piston side oil chamber 26. In this case, the piston side oil chamber 26 receives a free piston 27 with an O-ring 27A arranged close to the piston 24. The free piston 27 sections the piston side oil chamber 26 into an upper piston side oil chamber 26A and a lower piston side oil chamber 26B.

The piston 24 is provided with an absorber valve 28 and a return valve 29 respectively in two flow passages communicating between the piston rod side oil chamber 25 and the piston side oil chamber 26A. The absorber valve 28 is opened when pressure within the piston rod side oil chamber 25 is abnormally increased, such as under an impact force application caused by collision with an obstacle. When the increased pressure reaches a predetermined pressure value, the oil within the piston rod side oil chamber 25 is fed to the upper piston side oil chamber 26A. The return valve 29 can be opened when pressure within the upper piston side oil chamber 26A reaches a predetermined pressure value under an application of empty weight of the tilted-up propulsion unit 15, after absorbing the impact force caused by the collision against the obstacle.

The gas cylinder apparatus 20 is structured such that a gas chamber 31 communicates with the piston rod side oil chamber 25 and the piston side oil chamber 26 is integrally formed in a side of one side of the upper portion of the cylinder block 21. The gas chamber 31 may be provided with a lower oil chamber 33 via a free piston 32 with an O-ring 32A.

The gas cylinder apparatus 20 is provided with a switching valve apparatus 50 capable of switching the communication state among the piston rod side oil chamber 25, the piston side oil chamber 26 and the gas chamber 31, in the cylinder block 21. The switching valve apparatus 50 is provided in a side of an opposite side to the gas chamber 31, in the upper portion of the cylinder block 21.

The gas cylinder apparatus 20 has a communication passage 34 communicating the piston rod side oil chamber 25 with the switching valve apparatus 50. A communication passage 35 communicates the piston side oil chamber 26 with the switching valve apparatus 50, and a communication passage 36 communicates the gas chamber 31 and therefore the lower oil chamber 33 with the switching valve apparatus 50. The switching valve apparatus 50 is switched and set to any one of an off mode in which all the communication passages 34, 35 and 36 are shut off with each other, and an on mode in which all the communication passages 34, 35 and 36 are communicated with each other.

When the switching valve apparatus 50 is set to the off mode, the gas cylinder apparatus 20 shuts off the communication among the piston rod side oil chamber 25, the piston side oil chamber 26 and the gas chamber 31 and therefore the lower oil chamber 33 so as to stop a telescopic motion of the piston rod 22. This allows the propulsion unit 15 to be in a tilt-lock state at all the positions without being affected by the gas chamber 31. In the off mode of the switching valve apparatus 50, even when the propulsion unit 15 collides with an obstacle and the piston rod 22 and the piston 24 are temporarily expanded, no oil of the lower oil chamber 33 in the gas chamber 31 is supplied to the lower piston side oil chamber 26B in the lower side of the free piston 27. The stop position of the free piston 27 is therefore not displaced before or after the collision. An amount of oil flowing into the upper piston side oil chamber 26A from the piston rod side oil chamber 25 via the absorber valve 28 becomes the same as the amount of oil returned to the piston rod side oil chamber 25 from the upper piston side oil chamber 26A via the return valve 29. Accordingly, it is possible to securely coincide the return position after absorbing the impact of the piston rod 22 against the cylinder block 21 with the stop position before absorbing the impact.

When the switching valve apparatus 50 is set to the on mode, the gas cylinder apparatus 20 communicates the piston rod side oil chamber 25, the piston side oil chamber 26, the gas chamber 31 and therefore the lower oil chamber 33 with each other so as to make it possible to expand the piston rod 22. This makes it possible to manually tilt the propulsion unit 15 up and down. In the on mode of the switching valve apparatus 50, the gas pressure of the gas chamber 31 applies an assist force to the piston rod 22, and reduces the operating force for manually tilting up and down. Further, in the on mode of the switching valve apparatus 50, the oil in an amount corresponding to a volumetric capacity of the piston rod 22 draining from the piston rod side oil chamber 25 and the piston side oil chamber 26 is supplied to the piston side oil chamber 26 from the lower oil chamber 33 of the gas chamber 31 in the tilt-up stroke of the gas cylinder apparatus 20. The oil in an amount corresponding to a volumetric capacity of the piston rod 22 moving forward to the piston rod side oil chamber 25 and the piston side oil chamber 26 is supplied to the lower oil chamber 33 from the piston side oil chamber 26 in the tilt-down stroke of the gas cylinder apparatus 20.

In this case, the gas cylinder apparatus 20 is provided with a temperature compensating relief valve 39 in a valve insertion portion 38 arranged in a middle portion of a communication passage 37 communicating between the piston side oil chamber 26 and the lower oil chamber 33 of the gas chamber 31. When the temperature of the working fluid in the piston rod side oil chamber 25 and the piston side oil chamber 26 is abnormally increased in the off-mode of the switching valve apparatus 50, the oil in the piston side oil chamber 26 is relieved from the relief valve 39 to the lower oil chamber 33.

The gas cylinder apparatus 20 is made as follows in (A) an arrangement structure of the communication passages 34 to 37 provided in the cylinder block 21, and (B) a structure of the switching valve apparatus 50.

(A) Arrangement structure of communication passages 34 to 37 in cylinder block 21 (FIGS. 2 to 4 and 6)

The communication passage 34 is a transverse hole provided in the cylinder block 21, and is open to an upper end portion of the piston rod side oil chamber 25. The communication passage 34 is a short hole and is drilled in the cylinder block 21 after being casted.

The communication passage 35 is constituted by a transverse hole 35A, a vertical hole 35B and a transverse hole 35C which are provided in the cylinder block 21. The transverse hole 35A open to a lower end portion of the piston side oil chamber 26, and the transverse hole 35C open to the switching valve apparatus 50 are relatively short holes, and are formed in the cylinder block 21 after being casted, by drilling. The transverse hole 35A is sealed by a plug 35D. The vertical hole 35B is a relatively long hole connecting the transverse hole 35A to the transverse hole 35C, and is formed after casting the cylinder block 21.

The communication passage 36 is formed by using the cylinder block 21 and the rod guide 23. At this time, the gas cylinder apparatus 20 is structured such that an upper end inner peripheral portion of a pipe 43 constituted by a drawn tube is fitted in a liquid tight manner via an O-ring 42A to a lower end small diameter portion 42 of a cap 41 screwed in a liquid tight manner with the cylinder block 21 via an O-ring 41A. The pipe 43 is inserted to the cylinder block 21, and the gas chamber 31. The free piston 32 and the lower oil chamber 33 mentioned above are provided in an inner portion of the pipe 43. Reference numeral 44 denotes a gas charged portion.

Further, the communication passage 36 is constituted by an annular hole 36A provided in an annular hollow portion between the cylinder block 21 and the pipe 43, an oblique hole 36B provided in the cylinder block 21, an annular groove 36C provided in the rod guide 23, and a transverse hole 36D provided in the cylinder block 21. The annular hole 36A is a relatively long hole, and is communicated with the lower oil chamber 33 from a lower end notch portion of the pipe 43. The oblique hole 36B is a relatively short hole connecting an upper end portion of the annular hole 36A to the annular groove 36C, and is drilled in the cylinder block 21 after being casted. The annular groove 36C is cut on an outer periphery of the rod guide 23. The transverse hole 36D is a relatively short hole connecting the annular groove 36C to the switching valve apparatus 50, and is drilled in the cylinder block 21 after being casted.

The communication passage 37 is constituted by a transverse hole 37A and a vertical hole 37B which are provided in the cylinder block 21. The transverse hole 37A is a relatively short hole connecting the piston side oil chamber 26 to the valve insertion portion 38, and is drilled in the cylinder block 21 after being casted. The valve insertion portion 38 is sealed by a plug 38A. The vertical hole 37B is a relatively short hole connecting the valve insertion portion 38 to the lower oil chamber 33, and may be formed at a time of casting the cylinder block 21, or may be drilled in the cylinder block 21 after being casted.

Accordingly, in the gas cylinder apparatus 20, the relatively long hole formed when casting the cylinder block 21 is only the vertical passage 35B of the communication passage 35. Further, since the gas chamber 31 is formed by the pipe 43 of the drawn tube, the free piston 32 can be received without working the pipe 43.

(B) Structure of switching valve apparatus 50 (FIGS. 5 to 9)

Figure 5:
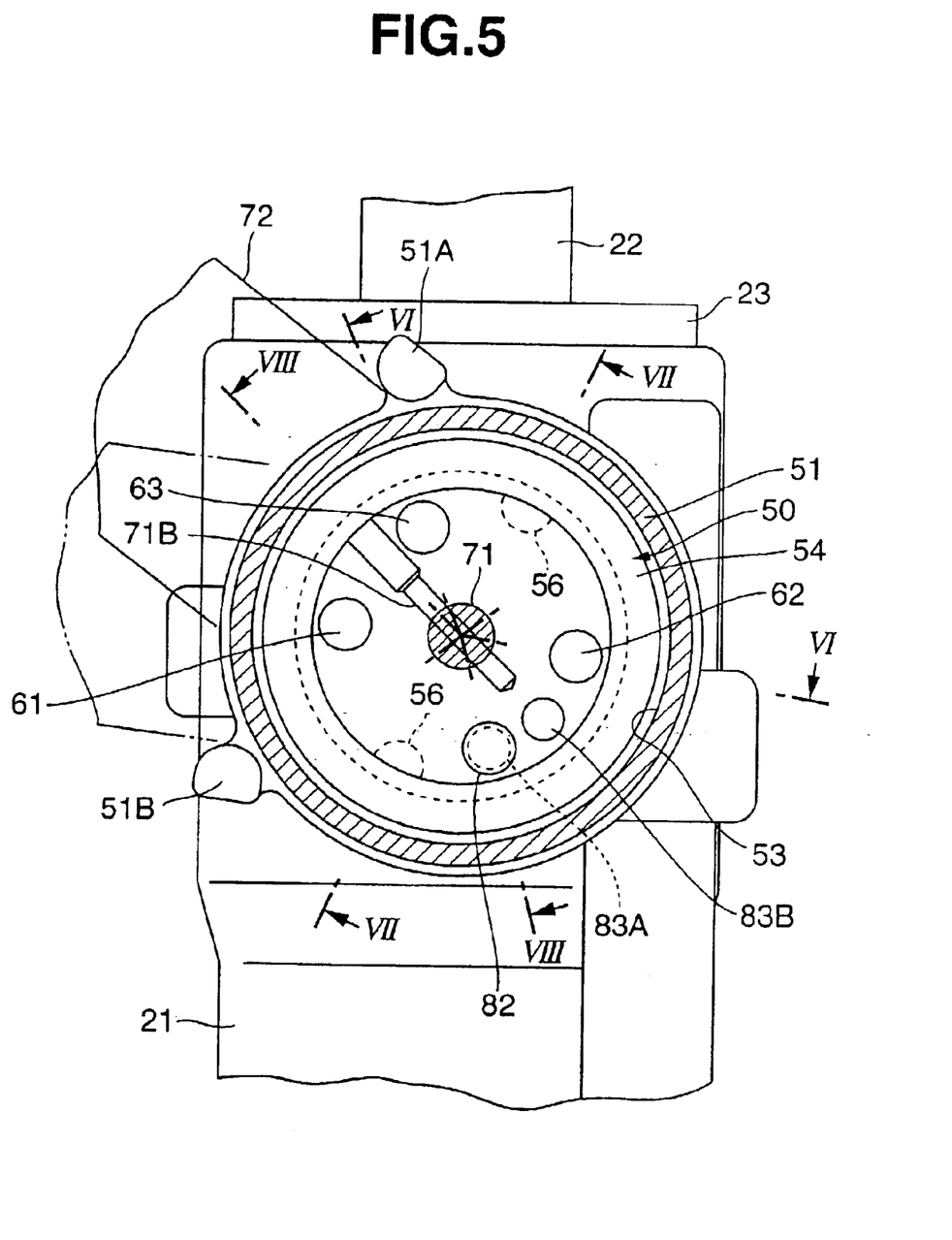
FIG. 5 is a view along a line V—V in FIG. 2.

The switching valve apparatus 50 has a valve case 51 integrally formed in a side portion of an opposite side to the gas chamber 31 as mentioned above, in the upper portion of the cylinder block 21. The apparatus is provided with a cap 52 which cooperates in a liquid tight manner in the valve case 51 via an O-ring 52A by screwing, and forms a communication chamber 53 in an inner space of the valve case 51.

The switching valve apparatus 50 is structured such that a valve guide 54 and a spacer 55 are received in the valve case 51. The valve guide 54 is fitted to a fitting projection 56 of the valve case 51 so as to be positioned and prevented from rotating, and the valve guide 54 and the spacer 55 are locked by the cap 52. Further, the spacer 55 may use a structure which is integrally formed in the cap.

Figure 9:
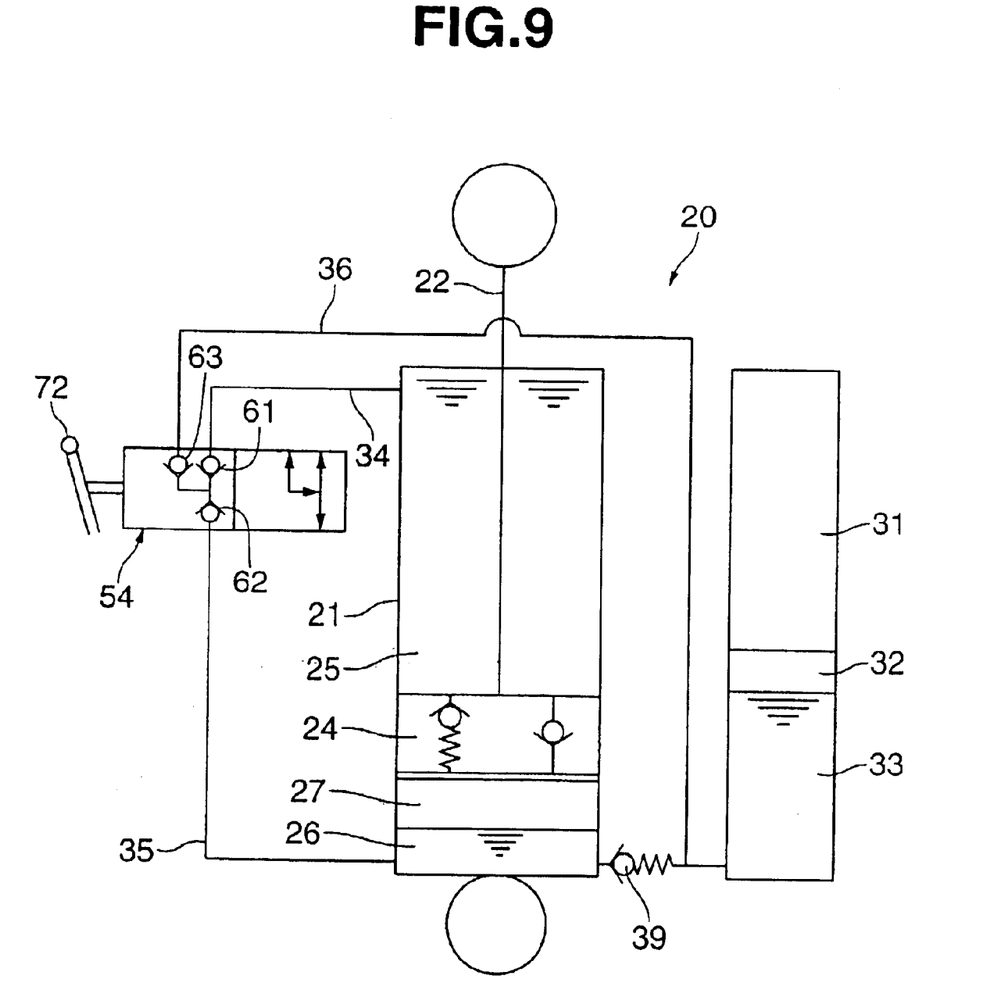
FIG. 9 is a hydraulic circuit diagram of a gas cylinder apparatus.

The switching valve apparatus 50 is a three-way valve as shown in FIG. 9. Ports A, B and C of the respective communication passages 34, 35 and 36 provided in the valve case 51 are open to positions facing to the communication chamber 53 in the valve guide 54. The switching valve apparatus 50 is provided with a poppet valve 61 closed by hydraulic pressure of the piston rod side oil chamber 25 which prevents the oil from flowing from the piston rod side oil chamber 25 to the communication chamber 53, in the port A of the communication passage 34 communicating the piston rod side oil chamber 25 with the communication chamber 53. A poppet valve 62 closed by hydraulic pressure of the piston side oil chamber 26 prevents the oil from flowing from the piston side oil chamber 26 to the communication chamber 53, in the port B of the communication passage 35 communicating the piston side oil chamber 26 with the communication chamber 53. A poppet valve 63 closed by hydraulic pressure of the gas chamber 31 and therefore the lower oil chamber 33 prevents the oil from flowing from the gas chamber 31 and therefore the lower oil chamber 33 to the communication chamber 53, in the port C of the communication passage 36 communicating the gas chamber 31 and therefore the lower oil chamber 33 with the communication chamber 53.

Figure 6:
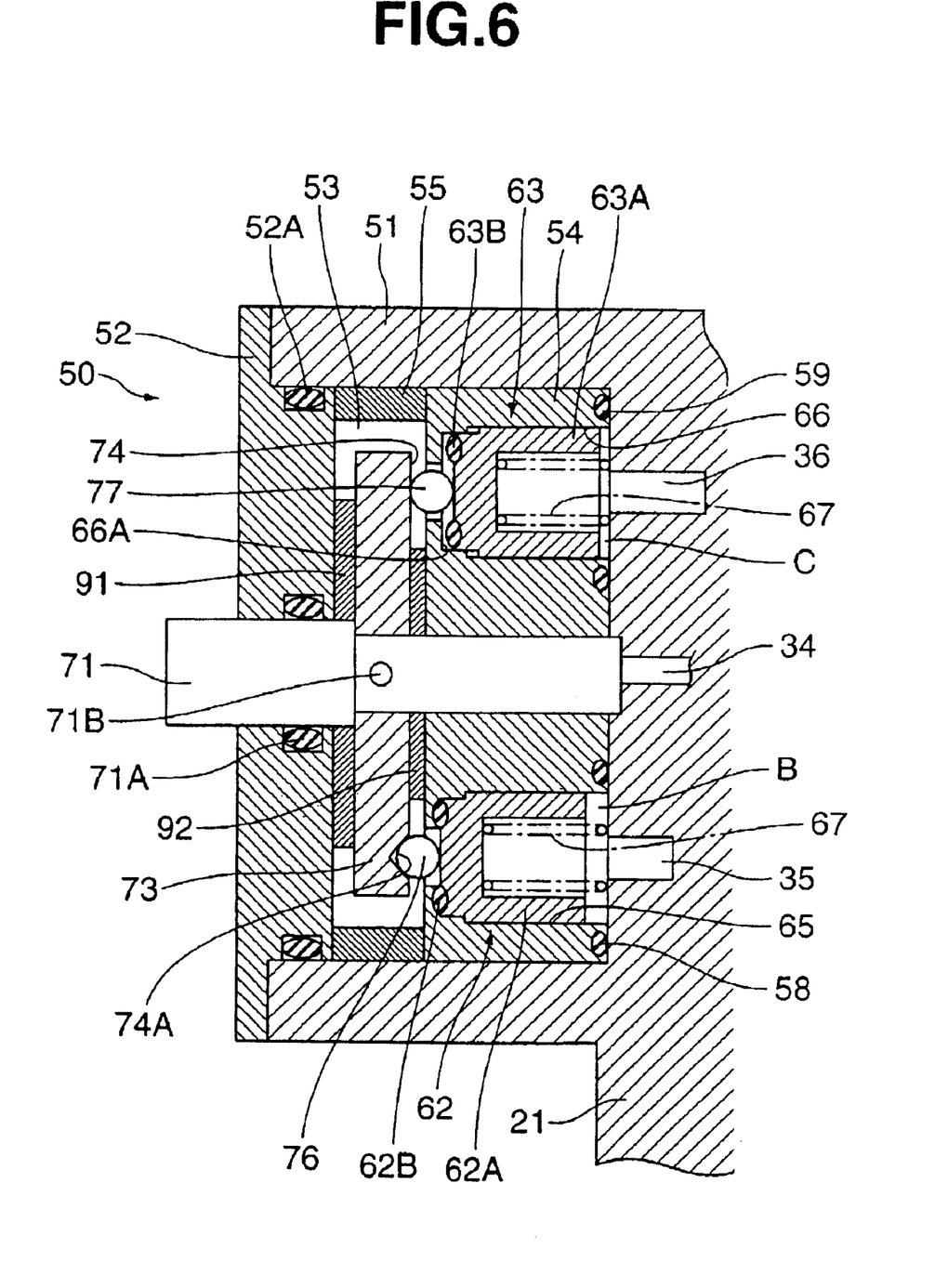
FIG. 6 is a cross sectional view along a line VI—VI in FIG. 5.
Figure 7:
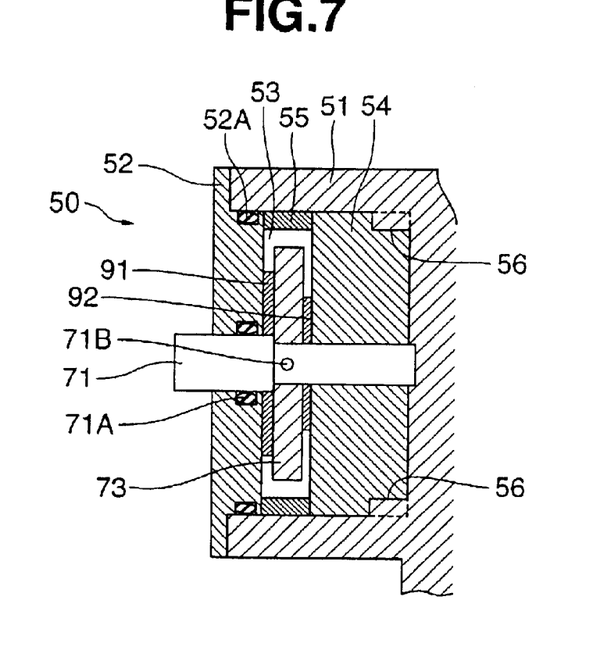
FIG. 7 is a cross sectional view along a line VII—VII in FIG. 5.
Figure 8:
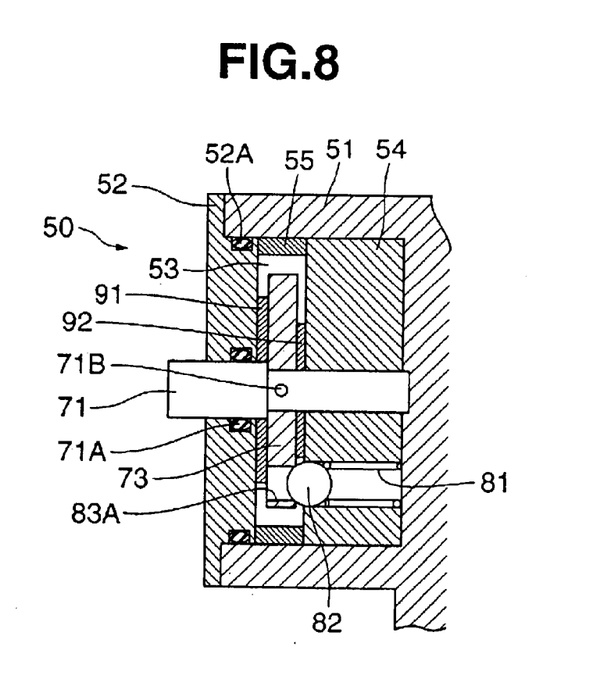
FIG. 8 is a cross sectional view along a line VIII—VIII in FIG. 5.

The switching valve apparatus 50 is provided with guide holes 64, 65 and 66 which are going to be aligned with the respective ports A to C, in the valve guide 54. Further, the switching valve apparatus 50 is provided with the respective poppet valves 61 to 63 in the respective guide holes 64 to 66 so as to be capable of linear movement where O-rings 57 to 59 provided in outer peripheries of end surfaces of the guide holes 64 to 66 are closely attached to the seat surface 51A of the valve case 51. Each of the poppet valves 61 to 63 constitutes a check valve of the present invention. The respective poppet valves 61 to 63 close the respective ports A to C by seating seal members 61B to 63B provided on outer end surfaces of valve bodies 61A to 63A on valve seats 64A to 66A of the respective guide holes 64 to 66, and open the respective ports A to C by releasing them. The valve guide 54 is provided with holes 64B to 66B open to the communication chamber 53 in center portions of the respective valve seats 64A to 66A. A valve spring 67 interposed between a back surface of each of the poppet valves 61 to 63 and a seat surface 51A of the valve case 51 and which is structured such as to improve a response of each of the valve bodies 61A to 63A, however, can be omitted.

In this case, the switching valve apparatus 50 can open and close all the poppet valves 61 to 63 provided in the valve guide 54 at one time, in the present embodiment, which can open and close simultaneously. The ports A to C of all the communication passages 34 to 36 can communicate with each other in the communication chamber 53 by opening all the poppet valves 61 to 63 in accordance with the opening operation. The ports A to C of all the communication passages 34 to 36 can be shut off with respect to the communication chamber 53 by closing all the poppet valves 61 to 63 in accordance with the closing operation.

Accordingly, the switching valve apparatus 50 is structured such that a rotation shaft 71 supported by the valve case 51 is inserted in a liquid tight manner to the cap 52 via an O-ring 71A. A rotation operating lever 72 is provided in an outer end portion of the rotation shaft 71. An inner end portion of the rotation shaft 71 is pivoted to a bearing recess portion provided in the seat surface 51A, and a rotation plate 73 is integrally formed in a middle portion of the rotation shaft 71 via a spring pin 71B.

The switching valve apparatus 50 clamps balls 75 to 77 between a ball operation surface 74, such as a recess 74A or the like, of a rotation plate 73, and an outer end surface of each of the valve bodies 61A to 63A of the poppet valves 61 to 63. The switching apparatus moves each of the poppet valves 61 to 63 close to or apart from each of the valve seats 64A to 66A of the corresponding ports A to C via each of the balls 75 to 77 in accordance with the rotating operation of the rotation plate 73. Each of the balls 75 to 77 is loosely fitted to each of the holes 64B to 66B of the valve guide 54 so as to be held. When the balls 75 to 77 are deflected from the recess 74A of the ball operation surface 74 in the rotation plate 73 in accordance with the rotation of the rotation plate 73, the poppet valves 61 to 63 are pressed down by the balls 75 to 77, whereby the poppet valves 61 to 63 are opened at one time.

The switching valve apparatus 50 has a click ball 82 which is backed up in a part of a peripheral direction on an end surface opposing to the rotation plate 73 of the valve guide 54 by a click spring 81. A closed position corresponding hole 83A and an open position corresponding hole 83B are provided in two positions which are apart from each other in a peripheral direction of a flat surface of the rotation plate 73. The rotation operating lever 72 is rotated until being collided and aligned with the closed side stopper 51A of the valve case 51 (FIG. 3). When the closed position corresponding hole 83A of the rotation plate 73 is engaged with the click ball 82 of the valve guide 54, the rotation plate 73 is set to a closing operation position, shown in a lower half of FIG. 8. The rotation operating lever 72 is rotated until being collided and aligned with the open side stopper 51B of the valve case 51 (FIG. 3). When the open position corresponding hole 83B of the rotation plate 73 is engaged with the click ball 82 of the valve guide 54, the rotation plate 73 is set to an opening operation position.

Accordingly, the switching valve apparatus 50 rotates the rotation plate 73 integrally formed with the rotation shaft 71 by the rotation operating lever 72. (a) When positioning the rotation plate 73 at the closing operation position, the recess 74A of the ball operation surface 74 in the rotation plate 73 receives the balls 75 to 77, whereby the pressing down of the poppet valves 61 to 63 by means of the balls 75 to 77 is canceled. Each of the poppet valves 61 to 63 is seated on the valve seats 64A to 66A in the corresponding ports A to C so as to close the ports A to C, whereby the off mode mentioned above shutting off all the communication passages 34 to 36 is set, shown in a lower half of FIG. 6.

Alternately, the switching valve apparatus 50 rotates the rotation plate 73 integrally formed with the rotation shaft 71 by the rotation operating lever 72. (b) When positioning the rotation plate 73 at the opening operation position, the flat surface of the rotation plate 73 presses down the balls 75 to 77. This thereby releases each of the poppet valves 61 to 63 from the valve seats 64A to 66A in the corresponding ports A to C so as to connect the ports A to C with the communication chamber 53. The on mode mentioned above communicating all the communication passages 34 to 36 with each other is set, shown in an upper half of FIG. 6.

In this case, the switching valve apparatus 50 can adjust an opening and closing timing of each of the poppet valves 61 to 63 in accordance with the rotating operation of the rotation plate 73, by controlling shapes of the ball operation surface 74, such as the recess 74A or the like, of the rotation plate 73 and the valve bodies 61A to 63A of the respective poppet valves 61 to 63, which clamps the balls 75 to 77 therebetween. For example, when making the recess 74A of the ball operation surface 74 with which the ball 77 corresponding to the poppet valve 63 in shallow contact, or flat, and making the recess 74A of the ball operation surface 74 with which the balls 75 and 76 corresponding to the poppet valves 61 and 62 in deep contact, the switching valve apparatus 50 is set to the on mode. The poppet valve 63 in the port C of the gas chamber 31 and therefore the lower oil chamber 33, is antecedently opened. The poppet valves 61 and 62 in the ports A and B of the piston rod side oil chamber 25 and the piston side oil chamber 26 are subsequently opened.

Further, the switching valve apparatus 50 can smoothly rotate the rotation plate 73 by interposing a thrust washer 91 between the rotation plate 73 and the cap 52 of the valve case 51 and interposing a thrust washer 92 between the rotation plate 73 and the valve guide 54.

In accordance with the present embodiment, the following effect can be obtained.

(1) The switching valve apparatus 50 opens and closes each of the poppet valves 61 to 63 via the balls 75 to 77 held between the ball operation surface 74 of the rotation plate 73 and each of the poppet valves 61 to 63, in the inner portion of the valve case 51. The balls 75 to 77 are easily arranged, have a good assembling property, and the switching valve apparatus 50 can be made compact and simple without requiring a specific support structure provided in the valve case 51.

(2) The recess 74A is provided in each of the portions holding the balls 75 to 77 between the ball operation surface 74 of the rotation plate 73 and each of the poppet valves 61 to 63. In the opening and closing operation ends of the rotation plate 73, it is possible to obtain a click of the opening and closing operation. It is also possible to do away with the necessity that a click mechanism such as a click ball 82 or the like is independently provided, and it is possible to make the switching valve apparatus 50 simple.

(3) The communication chamber 53 becomes a closed space by the closing operation of the switching valve apparatus 50. That is, each of the poppet valves 61 to 63 constituting the switching valve apparatus 50 is structured such as to be closed by the pressure of the piston rod side oil chamber 25, the piston side oil chamber 26 or the gas chamber 31, and is kept closed even when the pressure is increased, and the communication chamber 53 forms a closed space. When the working fluid in the communication chamber 53 mentioned above is expanded due to an abnormal temperature increase, the hydraulic pressure of the communication chamber 53 reaches a high pressure level. However, the high pressure oil pushes open any of the check valves so as to blow by itself, in one case the poppet valve 63 corresponding to the low pressure gas chamber 31 blows, so that it is not necessary that the temperature compensating relief valve mechanism is provided in the communication chamber 53 for the purpose of preventing the switching valve apparatus 50 from being broken. It is thereby possible to make the switching valve apparatus 50 simple.

(4) The gas chamber 31 is shut off with respect to the communication chamber 53 in accordance with the closing operation of the switching valve apparatus 50, and the oil in the gas chamber 31 is not drawn into the side of the communication chamber 53. Accordingly, the gas cylinder apparatus 20 has the free piston 27 arranged close to the piston 24, and has the absorber valve 28 and the return valve 29 in the piston 24. Therefore, even when the propulsion unit 15 collides with the obstacle and the piston 24 and the piston rod 22 are temporarily expanded, the oil in the gas chamber 31 opens the poppet valve 63 and is not supplied to the piston side oil chamber 26 in the lower side of the free piston 27. The stop position of the free piston 27 is thereby not displaced before or after the collision. Accordingly, it is possible to coincide the return position after absorbing the impact of the piston rod 22 against the cylinder block 21 with the stop position before absorbing the impact.

(5) It is possible to adjust the opening and closing timing of each of the poppet valves 61 to 63 by adjusting the shape of the portion holding each of the balls 75 to 77 between the ball operation surface 74 of the rotation plate 73 and each of the poppet valves 61 to 63. For example, it is possible to adjust the depth of the recess 74A provided on the ball operation surface 74 of the rotation plate 73 so as to antecedently open the poppet valve 63 corresponding to the gas chamber 31 and subsequently open the other poppet valves 61 and 62.

(6) Since the thrust washer 91 is interposed between the valve case 51, the cap 52, and the rotation plate 73, it is possible to prevent frictional displacement between the rotation plate 73 and the valve case 51 and the cap 52. It is possible to reduce the generation of frictional forces, and it is possible to smoothly rotate the rotation plate 73. The same effect can be obtained by the thrust washer 92 interposed between the valve guide 54 and the rotation plate 73.

Figure 10:
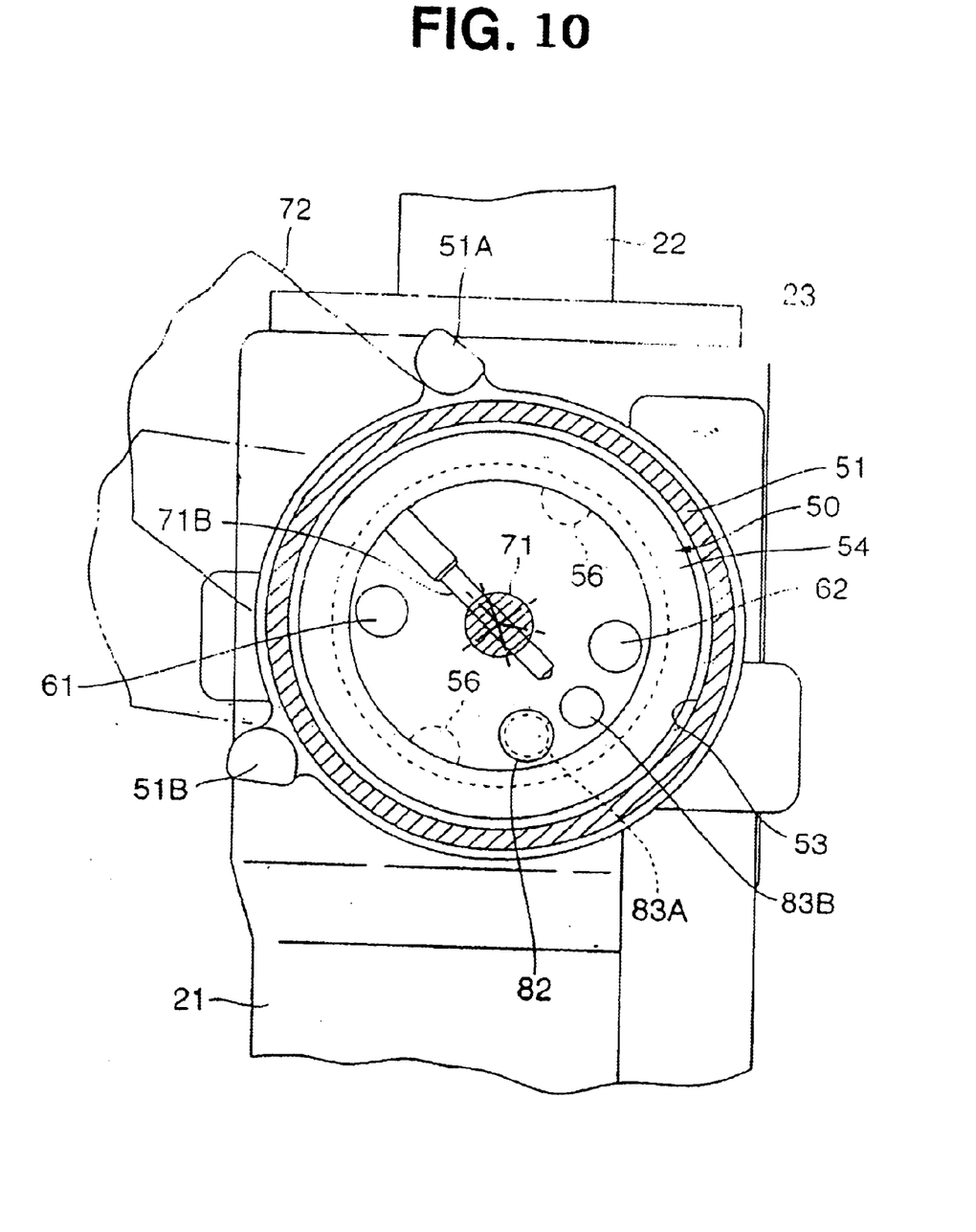
FIG. 10 is a cross sectional view of an alternative embodiment of the switching valve apparatus of the marine gas cylinder apparatus.

A gas cylinder apparatus 20 in accordance with a further embodiment is different from the gas cylinder apparatus 20 in accordance with the first embodiment mainly in that the poppet valve 63 provided in the communication passage 36 communicating the gas chamber 31, and therefore the lower oil chamber 33 with the communication chamber 53 is omitted. Also, the gas chamber 31 and therefore the lower oil chamber 33, is directly communicated with the communication chamber 53. Further, the structure is made such as to set a valve opening pressure for opening the poppet valves 61 and 62 provided in the communication passages 34 and 35 respectively communicating the piston rod side oil chamber 25 and the piston side oil chamber 26 with the communication chamber 53 higher than a gas charged pressure in the gas chamber 31.

In the gas cylinder apparatus 20 in accordance with this further embodiment, there is provided a structure in which the poppet valve 62 is not opened even when the obstacle is collided with the propulsion unit 15 where the poppet valves 61 and 62 are closed. This is achieved by setting the poppet valves only to two poppet valves 61 and 62, and setting the valve opening pressure for the poppet valves 61 and 62 higher than the gas charged pressure of the gas chamber 31 by the valve spring 67. Accordingly, even when the gas chamber 31 is always communicated with the communication chamber 53, no oil flows into the piston rod side oil chamber 25 and the piston side oil chamber 26, and the free piston 27 does not move.

In accordance with the gas cylinder apparatus 20 of the second embodiment, the same effects as the items (1) to (6) mentioned above in the first embodiment can be obtained only by using two poppet valves 61 and 62.

As heretofore explained, embodiments of the present invention have been described in detail with reference to the drawings. However, the specific configurations of the present invention are not limited to the illustrated embodiments but those having a modification of the design within the range of the present claimed invention are also included in the present invention. For example, in carrying out the present invention, the check valve is not limited to the poppet valve.

In accordance with the present invention, in a marine gas cylinder apparatus, it is possible to move the propulsion unit up and down easily, and it is possible to make the switching valve apparatus compact and simple.

Further, in accordance with the present invention, in the marine gas cylinder apparatus, it is possible to prevent the stop position of the free piston from being displaced before and after the collision with the obstacle.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A marine gas cylinder apparatus, comprising: a cylinder block connectable to one of a hull and a propulsion unit, a piston rod insertable into the cylinder block from a rod guide provided in the cylinder block being connectable to the other of the hull and the propulsion unit, a piston rod side oil chamber disposed in a side receiving the piston, rod an&a piston side oil chamber disposed in a side not receiving the piston rod being provided within the cylinder block, a gas chamber in communication with the piston rod side oil chamber and the piston side oil chamber being integrally formed in the cylinder block, a switching valve apparatus capable of switching a communication state among the piston rod side oil chamber, the piston side oil chamber and the gas chamber provided in the cylinder block, the switching valve apparatus being provided with a check valve closed by hydrauiic pressure of the piston rod side oil chamber in a communication passage communicating the piston rod side oil chamber with a communication chamber, a check valve closed by hydraulic pressure of the piston side oil chamber in a communication passage communicating the piston side oil chamber with the communication chamber, a check valve closed by hydraulic pressure of the gas chamber in a communication passage communicating the gas chamber with the communication chamber, the switching valve apparatus being arranged and constructed to open and close all the check valves at one time, and open all the check valves in accordance with an opening operation, whereby all the communication passages are communicated with each other in the communication chamber, and close all the check valves in accordance with a closing operation, whereby all the communication passages are shut off with respect to the communication chamber.

2. A marine gas cylinder apparatus according to claim 1, wherein the switching valve apparatus is arranged and constructed to open ports of the respective communication passages to the communication chamber provided in a valve case, to arrange the respective check valves in the ports of the respective communication passages, to hold a ball between a ball operation surface of a rotation body supported to the valve case and each of the check valves, and move each of the check valves close to or apart from the corresponding port via the ball in accordance with a rotating operation of the rotation body.

3. A marine gas cylinder apparatus comprising: a cylinder block being connectable to one of a hull and a propulsion unit, a piston rod insertable into the cylinder block from a rod guide provided in the cylinder block and being connectable to another of the hull and the propulsion unit, a piston rod side oil chamber disposed in a side receiving the piston rod and a piston side oil chamber disposed in a side not receiving the piston rod are being provided within the cylinder block, a gas chamber in communication with the piston rod side oil chamber and the piston side oil chamber being integrally formed in the cylinder block, a switching valve apparatus capable of switching a communication state among the piston rod side oil chamber, the piston side oil chamber and the gas chamber provided in the cylinder block, the switching valve apparatus being provided with a check valve closed by hydraulic pressure of the piston rod side oil chamber in a communication passage communicating the gas chamber with a communication chamber and communicating the piston rod side oil chamber with the communication chamber, and a check valve closable by hydraulic pressure of the piston side oil chamber in a communication passage communicating the piston side oil chamber with the communication chamber, the switching valve apparatus being arranged and constructed to open and close all the check valves at one time, and open all the check valves in accordance with an opening operation, whereby all the communication passages are communicated with each other in the communication chamber, and close all the check valves in accordance with a closing operation, whereby all the communication passages are shut off with respect to the communication chamber, the switching valve apparatus being arranged and constructed to open ports of the respective communication passages to the communication chamber provided in a valve case, arrange each of the check valves having a valve opening pressure higher than a gas charged pressure in each of the port of the communication passage in the piston rod side oil chamber and the port of the communication passage in the piston side oil chamber, hold a ball between a ball operation surface of a rotation body supported to the valve case and each of the check valves, and move each of the check valves close to or apart from the corresponding port via the bail in accordance with a rotating operation of the rotation body.

4. A marine gas cylinder apparatus according to claim 1, wherein the switching valve apparatus is arranged and construction to adjust an opening and closing timing of each of the check valves in correspondence to the rotating operation of a rotation body by being arranged and construction to adjust a shape of a portion holding a ball between a ball operation surface of the rotation body and each of the check valves.

5. A marine gas cylinder apparatus according to claim 4, wherein a thrust washer is interposed between a valve case and the rotation body.

6. A marine gas cylinder apparatus according to claim 3, wherein the switching valve apparatus is arranged and constructed to adjust an opening and closing timing of each of the check valves in correspondence to the rotating operation of the rotation body by being arranged and constructed to adjust a shape of a portion holding the ball between the ball operation surface of the rotation body and each of the check valves.

7. A marine gas cylinder apparatus according to claim 6, wherein a thrust washer is interposed between the valve case and the rotation body.

8. A marine gas cylinder apparatus according to claim 1, wherein a thrust washer is interposed between a valve case and the a rotation body.

9. A marine gas cylinder apparatus according to claim 3, wherein a thrust washer is interposed between the valve case and the rotation body.

10. A marine gas cylinder apparatus according to claim 1, wherein a valve guide is receivable in the a valve case, a guide hole is disposed in the valve guide at a position which is aligned with the port of each of the communication passages, and a poppet valve constituting each of the check valves is provided in the guide hole so as to be freely movable linearly.

11. A marine gas cylinder apparatus according to claim 10, wherein a valve spring is interposed between a seat surface of the valve case and a back surface of each of the poppet valves.

12. A marine gas cylinder apparatus according to claim 10, wherein a click ball backed up by a click spring disposable in a part of a peripheral direction on an end surface opposed to a rotation body of the valve guide, and a hole corresponding to a closed position of all the check valves and a hole corresponding to an open position thereof are disposed in two positions of a flat surface of the rotation body disposable close to or apart from each other in a peripheral direction.

13. A marine gas cylinder apparatus according to claim 10, wherein a thrust washer is interposable between a rotation body and the valve guide.

14. A marine gas cylinder apparatus according to claim 3, wherein a valve guide is receivable in the valve case, a guide hole is disposed in the valve guide at a position which is aligned with the port of each of the communication passages, and a poppet valve constituting each of the check valves is provided in the guide hole so as to be freely moveable linearly.

15. A marine gas cylinder apparatus according to claim 14, wherein a valve spring is interposable between a seat surface of the valve case and a back surface of each of the poppet valves.

16. A marine gas cylinder apparatus according to claim 14, wherein a click ball backed up by a click spring disposable in a part of a peripheral direction on an end surface opposed to the rotation body of the valve guide, and a hole corresponding to a closed position of all the check valves and a hole corresponding to an open position thereof are disposed in two positions of a flat surface of the rotation body disposable close to or apart from each other in a peripheral direction.

17. A marine gas cylinder apparatus according to claim 14, wherein a thrust washer is interposable between the rotation body and the valve guide.

* * * * *

UNITED STATES PATENT AND TRADEMARK OFFICE
CERTIFICATE OF CORRECTION

PATENT NO. : 6,857,921 B2  
APPLICATION NO. : 10/448911  
DATED : February 22, 2005  
INVENTOR(S) : Yoshimi Watanabe and Mitsuhiro Hayashi Page 1 of 1

It is certified that error appears in the above-identified patent and that said Letters Patent is hereby corrected as shown below:

Column 11, line 26: "rod an&a" should read -- rod and a --.

Column 12, line 44: "bail" should read --ball --

Signed and Sealed this

Fifth Day of June, 2007

JON W. DUDAS  
*Director of the United States Patent and Trademark Office*